United States Patent
Nikitin et al.

(10) Patent No.: US 6,686,587 B2
(45) Date of Patent: Feb. 3, 2004

(54) METHOD OF PRECISION CALIBRATION OF MAGNIFICATION OF A SCANNING MICROSCOPES WITH THE USE OF TEST DIFFRACTION GRATING

(75) Inventors: Arkady Nikitin, Ardsley, NY (US); Dmitriy Yeremin, Dobbs Ferry, NY (US)

(73) Assignee: General Phosphorix LLC, Ardsley, NY (US)

( * ) Notice: Subject to any disclaimer, the term of this patent is extended or adjusted under 35 U.S.C. 154(b) by 0 days.

(21) Appl. No.: 09/848,657

(22) Filed: May 4, 2001

(65) Prior Publication Data

US 2002/0179829 A1 Dec. 5, 2002

(51) Int. Cl.$^7$ .................................................. H01J 5/16
(52) U.S. Cl. ............................... 250/237 G; 250/201.3; 382/280
(58) Field of Search ............................ 250/201.3, 550, 250/237 G; 382/277, 280, 286, 293, 298, 299

(56) References Cited

U.S. PATENT DOCUMENTS 5,714,832 A * 2/1998 Shirrod et al. .............. 310/328
6,384,408 B1 * 5/2002 Yee et al. ................. 250/252.1

* cited by examiner

Primary Examiner—David Porta
Assistant Examiner—Stephen Yam
(74) Attorney, Agent, or Firm—I. Zborovsky

(57) ABSTRACT

A method of precision calibration of magnification of scanning microscopes with the use of a test diffraction grating includes positioning a test object on a stage of microscope so that strips of a test diffraction grating are perpendicular to a direction along which a calibration is performed, scanning of a selected portion of the test object along axes X and Y, measuring values of a signal S versus coordinates x and y in a plane of scanning and storing of the values S (x, y) in a digital form as a two-dimensional digital array, transforming the two-dimensional array of signals S(x, y) into a two-dimensional array S (u, v) by turning of the axes so that a direction of a new axis u is perpendicular to the strips of the grating and a direction of a new axis v coincides with the strips of the grating, line-by-line mathematical processing of the array S(u,v) for each line, converting of the one dimensional, complex function into a one-dimension spectrum of real values of a module, finding from the spectrum of the real values a greatest spectral maximum and determining its characteristic frequency as an abscissa of a point with the maximum value, calculating an average value of a pitch of the diffraction grating; performing the mathematical processing, the conversion, the determination and the calculation for subsequent lines with a new value of a coordinate v, statistically processing the thusly obtained values for all lines and determining an average value and a standard deviation over a whole frame, and determining a magnification $M_u$ in accordance with the selected direction u.

4 Claims, 4 Drawing Sheets

Image of a test object.
1- field of view; 2- pixels; 3- strips of the test diffraction grating; u- direction in which magnification of a microscope is to be determined

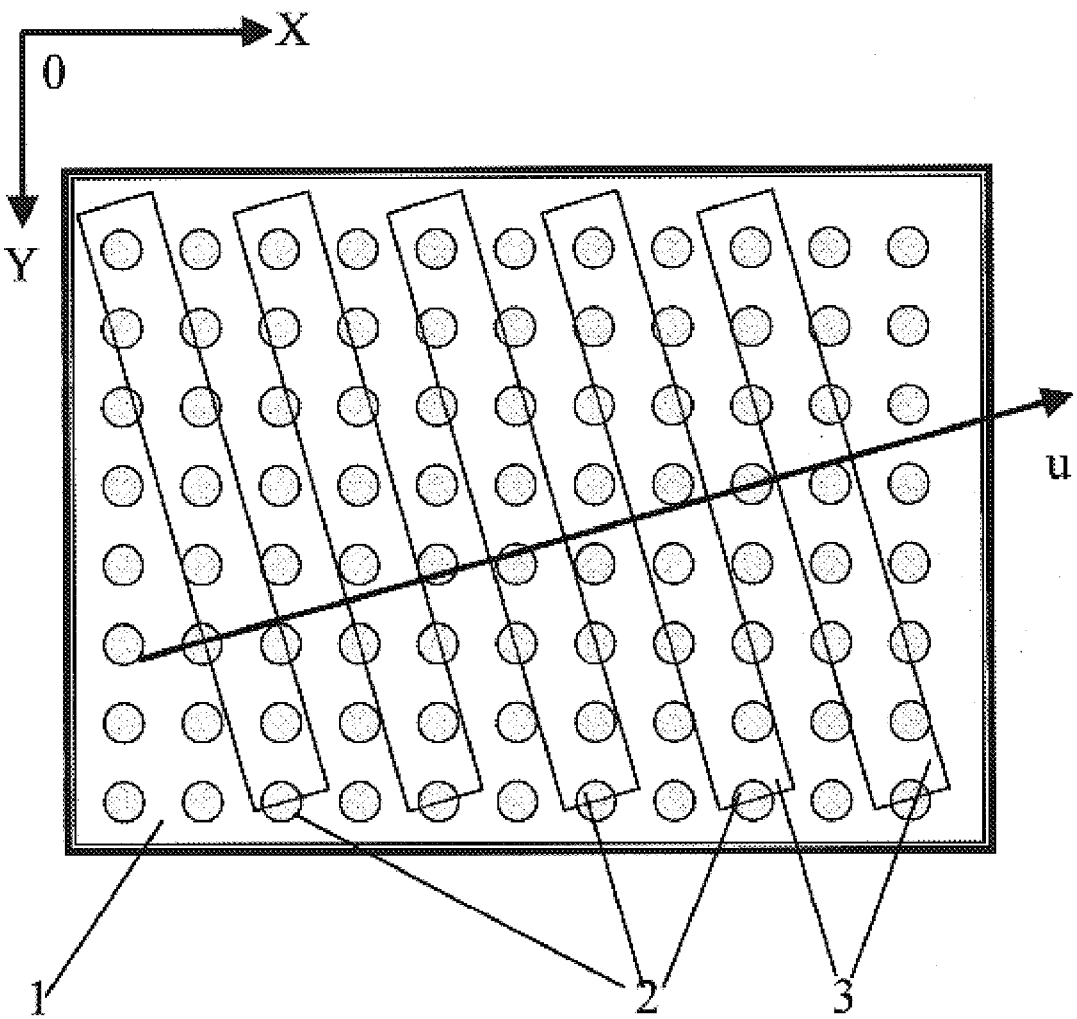
Figure 1. Image of a test object.
1- field of view; 2- pixels; 3- strips of the test diffraction grating; u- direction in which magnification of a microscope is to be determined

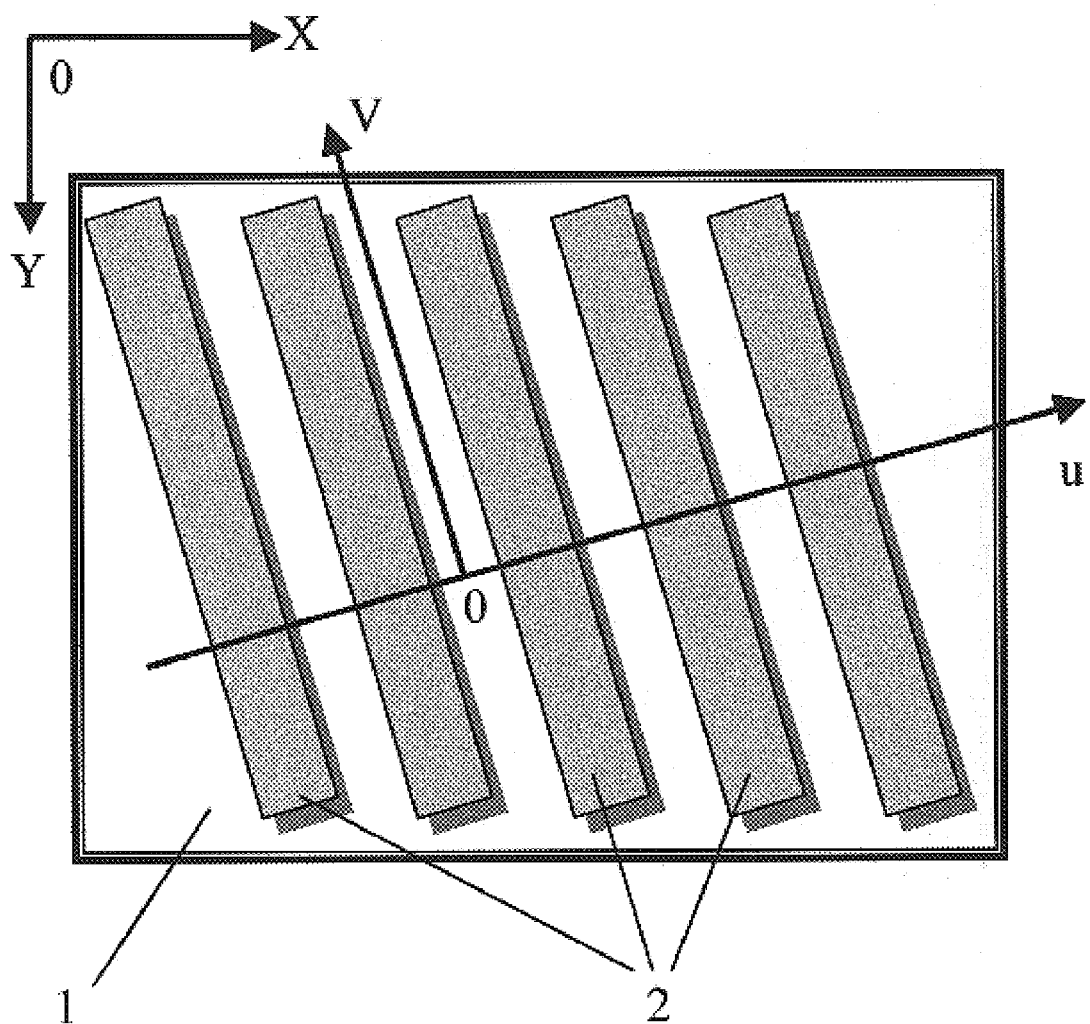
Figure 2. Initial and new coordinate systems.
1- microscope field of view; 2- strips of test diffraction grating

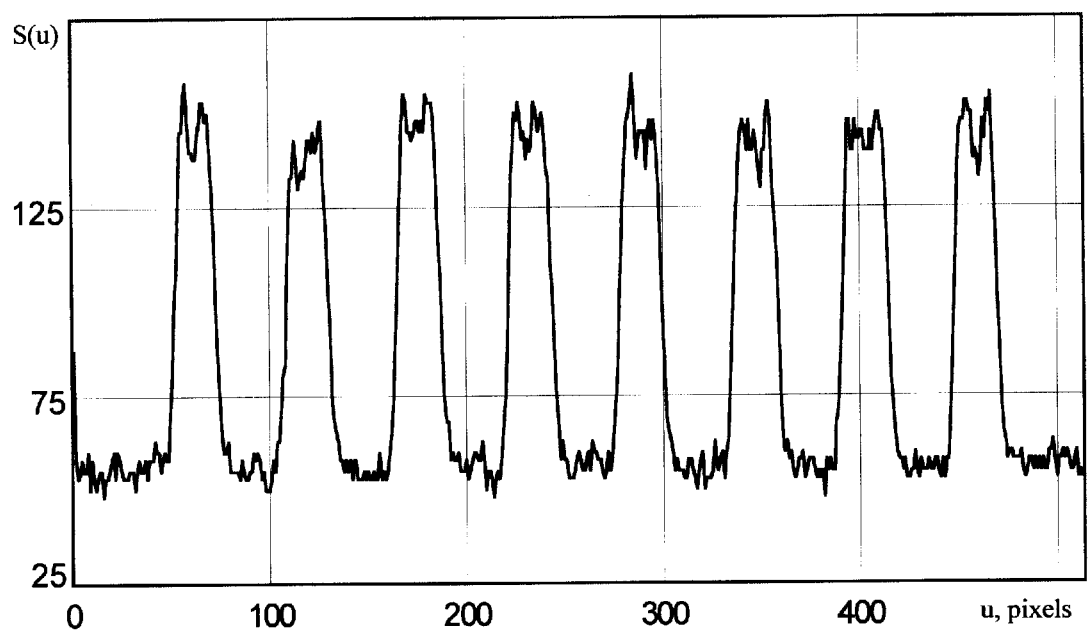
Figure 3. Video-signal S(u) from test diffraction grating

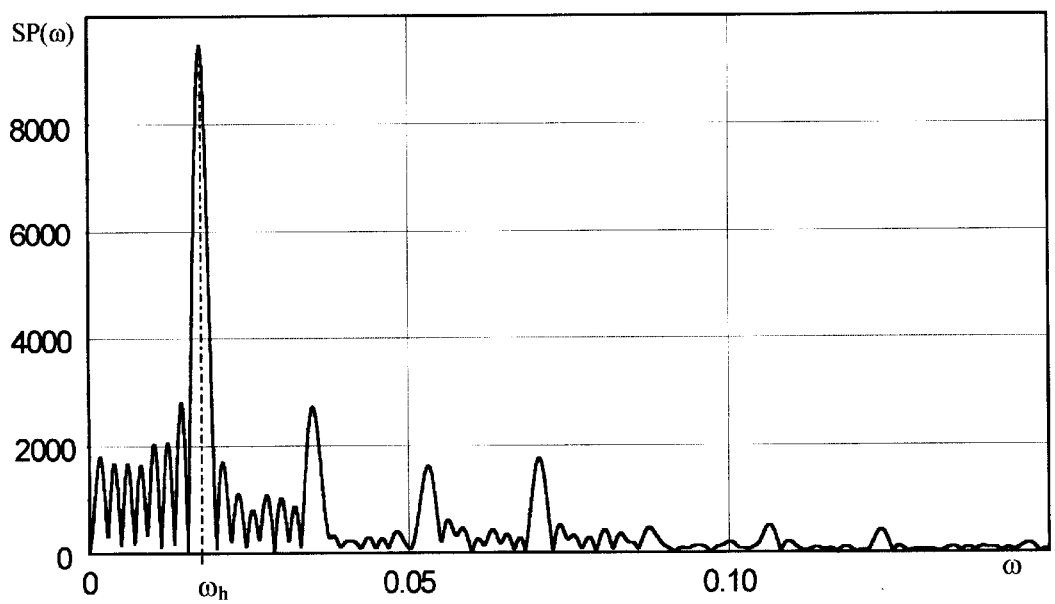
Figure 4. Fourier Spectrum of the line shown on Figure 3.

METHOD OF PRECISION CALIBRATION OF MAGNIFICATION OF A SCANNING MICROSCOPES WITH THE USE OF TEST DIFFRACTION GRATING

BACKGROUND OF THE INVENTION

The present invention relates to the methods of precision calibration of magnification of scanning microscopes with the use of a test diffraction grate.

Methods of precision calibration of a magnification of synthetic microscopes with the use of a test diffraction gratings are known. In the existing methods test object is positioned and oriented on a microscope table, and corresponding part of the test objects is scanned, with subsequent processing of the thusly obtained data. It is believed that the existing methods can be further improved.

SUMMARY OF THE INVENTION

Accordingly, it is an object of the present invention to provide a method of precision calibration of magnification of a scanning microscopes with the use of a test diffraction grating.

In keeping with these objects and with others which will become apparent hereinafter, one feature of present invention resides, briefly stated, in a method of precision calibration of magnification of scanning microscopes with the use of a test diffraction grating, comprising the steps of positioning and orientation of a test object on a table of microscope so that strips of a test diffraction grate are perpendicular to a direction along which a calibration is performed; scanning of a selected portion of the test object along axes X and Y; measuring values of a signal S versus coordinates X and Y in a plane of scanning and storing of said values S (x, y) in a digital form as a two-dimensional digital array; transforming the two-dimensional array of signals $S(x, y)$ into a two-dimensional array $S(u, v)$ by turning of the axes so that a direction of a new axis u is perpendicular to the strips of the grating and a direction of a new axis v coincides with the strips of the grating; line-by-line mathematical processing of the array $S(u,v)$ for each line $S(u)$ by calculating of a Fourier spectrum of the line $SP(\omega)$ in correspondence with the formula $$SP(\omega) = \frac{1}{\sqrt{2-}} \int_{-\infty}^{\infty} S(u) \cdot \exp(iu\omega) du,$$

wherein $\omega$ is a coordinate in a reciprocal space which represents a space frequency; $SP(\omega)$ is a complex spectrum density which corresponds to the space frequency $\omega$; $S(u)$ is a function which describes a one-dimensional profile of the signal; and $i=\sqrt{-1}$ is an imaginary unit; converting of the one dimensional complex function $SP(\omega)$ into a one-dimensional spectrum of real values of a module $|SP(\omega)|$ by multiplying of each value $SP(\omega)$ by a complex-conjugate value; finding from the spectrum of the real values T the greatest spectral maximum and determining its characteristic frequency $\omega_h$ as an abscissa of a point with the maximum value $|SP|$; calculating an average value of a pitch $T_h$ of the diffraction grate in accordance with the formula:

$$T_h = \frac{1}{W_h}$$

performing the mathematical processing, the conversion, the determination and the calculation for subsequent lines S(u) with a new value of a coordinate v; statistically processing the thusly obtained set of values $T_h$ for all lines and determining an average value T and a standard deviation ΔT over a whole frame; and determining a magnification $M_u$ in accordance with the selected direction u in accordance with the formula:

$$M_u = \frac{T \cdot L}{T_0 \cdot N},$$

where L is a width of a medium of image in direction of the calibration, $T_0$ is an independently obtained value of the pitch of the same test object, and N is a number of pixels in the line along the direction u.

When the method is performed in accordance with the present invention, it reliably provides a precision calibration of magnification of scanning microscopes, and achieves a very high accuracy of calibration.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view showing an image of a test object with directions of scanning and a direction in which a multiplication of a microscope is to be determined;

FIG. 2 is a view additionally illustrating a second coordinate system, in which an obtained array of signals is to be converted;

FIG. 3 is a view illustrating a transformed one dimensional array of signals in accordance with one line of azzay S(u,v); and FIG. 4 is a view showing a Fourier spectrum of the mathematically processed array of FIG. 3.

DESCRIPTION OF THE PREFERRED EMBODIMENTS

In accordance with the present invention a method for precision calibration of a magnification of a scanning microscope is performed with a test diffraction grating. FIG. 1 shows a field of view 1 of a scanning microscope with a plurality of pixels 2 of a signal of scanning with an image of a diffraction grating which has strips 3. The directions of scanning are identified with X and Y and the scanning is performed in accordance with these two perpendicular axes. A magnification of calibration the scanning electron microscope is performed in direction lower u. As can be seen from this drawing, the test object is positioned and oriented on the microscope so that the strips of the test diffraction grate are perpendicular to the direction u of calibration.

A portion of the test object which is shown in FIG. 1 is then scanned, and a plurality of values of the signal S versus the coordinates in a plane of scanning are obtained. These values are identified as S(x, y) and they are stored in a digital form as a two-dimensional digital array, for example in a memory of a computer. The thusly obtained two dimensional array of signals S(x, y) is transformed into a two dimensional array S(u, v) by turning of the axes, so that a direction of a new axis u is perpendicular to the strips of the grating, and a direction of a new axis v corresponds to the direction of the strips of the grating, as shown in FIG. 2. Thereby a new array of the signal is obtained.

Then line-by-line mathematical processing of the array S(u,v) is performed for each line S(u) by calculating of a Fourier spectrum of the line SP($\omega$) in correspondence with the formula $$SP(\bullet) = \frac{1}{\sqrt{2-}} \int_{-\infty}^{\infty} S(u) \cdot \exp(iu\omega) \, du,$$

wherein $\omega$ is a coordinate in a reciprocal space which represents a space frequency; SP ($\omega$) is a complex spectrum density which corresponds to the space frequency $\omega$; S(u) is a function which describes one-dimensional profile of a signal; and $i=\sqrt{-1}$ is an imaginary unit. The one dimensional, complex function SP ($\omega$) is converted into a one-dimensional spectrum of real values of a module $|SP(\omega)|$ by multiplying of each value SP ($\omega$) by a complex-conjugate value. From $|SP(\omega)|$ a greatest spectral maximum is then found, and a characteristic frequency $\omega_h$ is determined as an abscissa of a point with the maximum value $|SP|$. An average value of a pitch $T_h$ (e.g. a distance between strip of the diffraction grating) of the diffraction grating is calculated in accordance with the formula:

$$T_h = \frac{1}{W_h}$$

Then there are performed a mathematical processing, a conversion, a determination and a calculation for subsequent lines S(u) with a new value of a coordinate v. The thusly obtained values $T_h$ are statistically processed, and for all lines an average value T and a standard deviation $\Delta T$ over a whole frame are determined. A magnification $M_u$ in accordance with the selected direction u is determined in accordance with the formula:

$$M_u = \frac{T \cdot L}{T_0 \cdot N},$$

where L is a width of a medium of image in direction of the calibration, $T_0$ is an independently obtained value of the pitch of the test object, and N is a number of pixels in the line along the direction y.

In accordance with the invention before the line-by-line mathematical processing a preliminary evaluating determination of a pitch $T^1$ of the test object in its microscopic representation and an error value $\delta T^1$; is determined. A characteristic frequency $W_h^1$ and its error value $\Delta \omega_h^1$ in accordance with the formulas $$\omega_h' = \frac{1}{T^1} \text{ and } \Delta \omega_h^1 = \frac{2\delta T^1}{(T^1)^2 - (\delta T^1)^2}$$

Then a function SP($\omega$) is calculated by said line-by-line mathematical processing in a limited band of frequencies from $\omega_h^1 - \Delta \omega^1$ to $\omega_h^1 + \Delta \omega_h^1$.

Furthermore, in the inventive method the greatest spectral maximum can be determined by approximating of $|SP(\omega)|$ in a neighborhood of the greatest maximum by a corresponding analytical curve, localizing on the analytical curve an extemum with an abscissa taken as the characteristic frequency $\omega_h$.

The finding of the greatest valued spectral maximum can be performed by cutting off of a greatest spectral maximum in accordance with a predetermined threshold, and forming a region of a spectral maximum, calculating a centroid for said region, and fixating the characteristic frequency $\omega_h$ as an abscissa of the centroid.

In the inventive method before line-by-line mathematical processing, suppressing of a noise can be performed.

It will be understood that each of the elements described above, or two or more together, may also find a useful application in other types of methods and constructions differing from the types described above.

While the invention has been illustrated and described as embodied in method of precision calibration of magnification of a scanning microscopes with the use of test diffraction grating, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A method of precision calibration of magnification of a scanning microscope with the use of a test object formed as a test diffraction grating, comprising the steps of positioning and orienting a test object on stage of microscope so that strips of a test diffraction grating are perpendicular to a direction along which a calibration is performed; scanning of a selected portion of the test object along axes X and Y by the scanning microscope; measuring values of a signal S by the scanning microscope versus coordinates x and y in a plane of scanning and storing of said values S (x, y) in a digital form as a two-dimensional digital array; transforming the two-dimensional array of signals S(x, y) into a two-dimensional array S (u, v) by turning of the axes so that a direction of a new axis u is perpendicular to the strips of the grating and a direction of a new axis v coincides with the strips of the grating; line-by-line mathematical processing of the array S(u,v) for each line S(u) by calculating of a Fourier spectrum SP($\omega$) of each line S($\omega$) in correspondence with the formula $$SP(\omega) = \frac{1}{\sqrt{2\frac{1}{\pi}}} \int_{-\infty}^{\infty} S(u) \cdot \exp(iu\omega) \, du,$$

wherein $\omega$ is a coordinate in a reciprocal space which represents a space frequency; SP ($\omega$) is the Fourier spectrum which is a complex spectrum density corresponding to the space frequency $\omega$; S(u) is a function which describes a one-dimensional profile of a signal; and $i=\sqrt{-1}$ is an imaginary unit; converting of the one dimensional, complex function SP ($\omega$) into a one-dimension spectrum of real values of a module $|SP(\omega)|$ by multiplying of each value SP ($\omega$) by a complex-conjugate value; finding from the spectrum of the real values $|SP(\omega)|$ a greatest spectral maximum and determining its characteristic frequency $\omega_h$ as an abscissa of a point with the maximum value $|SP(\omega)|$; calculating an average value of a pitch $T_h$ of the diffraction grating in accordance with the formula:

$$T_h = \frac{1}{\omega_h}$$

performing the mathematical processing, the conversion, the determination and the calculation for subsequent lines $S(u)$ with a new value of a coordinate $v$; statistically processing a thusly obtained set of values $T_h$ for all lines and determining an average value $T$ and a standard deviation $\Delta T$ over a whole frame; and determining a magnification $M_u$ in accordance with the selected direction $u$ in accordance with the formula:

$$M_u = \frac{T \cdot L}{T_0 \cdot N}$$

where $L$ is a width of a medium of image in direction of the calibration, $T_0$ is an independently obtained value of the pitch of the test object, and $N$ is a number of pixels in the line along the direction $u$.

2. A method as defined in claim 1; and further comprising performing, before the line-by-line mathematical processing, a preliminary evaluating determination of a pitch $T^1$ of the test object in the microscope and an error value $\Delta T^1$; calculating of an evaluating characteristic frequency $\omega_h^{1'}$ and its error value $\Delta\omega_h^1$ in accordance with the formulas $$\omega_h' = \frac{1}{T^1} \text{ and } \Delta\omega_h^1 = \frac{2\Delta T^1}{(T^1)^2 - \left(\frac{1}{\Delta T^1}\right)^2};$$

and calculating of the spectrum $SP(\omega)$ by said line-by-line mathematical processing in a limited band of frequencies from $\omega_h^1 - \Delta\omega_h^1$ to $\omega_h^1 + \Delta\omega_h^1$.

3. A method as defined in claim 1, wherein finding of the greatest spectral maximum includes approximating of $|SP(\omega)|$ in a range which contains a plurality of values close to the greatest maximum by a corresponding analytical curve, localizing on the analytical curve a maximum with an abscissa taken as the characteristic frequency $\omega_h$.

4. A method as defined in claim 1, wherein said finding of the greatest spectral maximum value includes cutting off of the greatest spectral maximum in accordance with a predetermined threshold and forming a region which includes the spectral maximum, calculating a centroid for said region, and fixating of the characteristic frequency $\omega_h$ as an absissa of the centroid.

* * * * *